(No Model.) 2 Sheets—Sheet 1.
W. CURTIS.
APPARATUS FOR SEPARATING FIBERS, CLAY, OR OTHER MATERIAL FROM LIQUIDS.
No. 599,957. Patented Mar. 1, 1898.
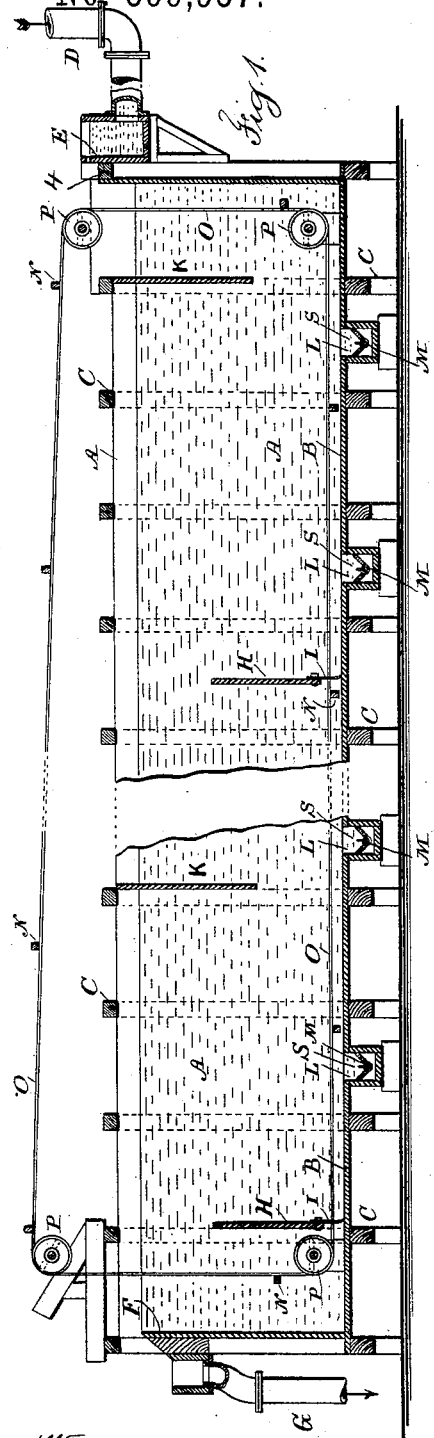
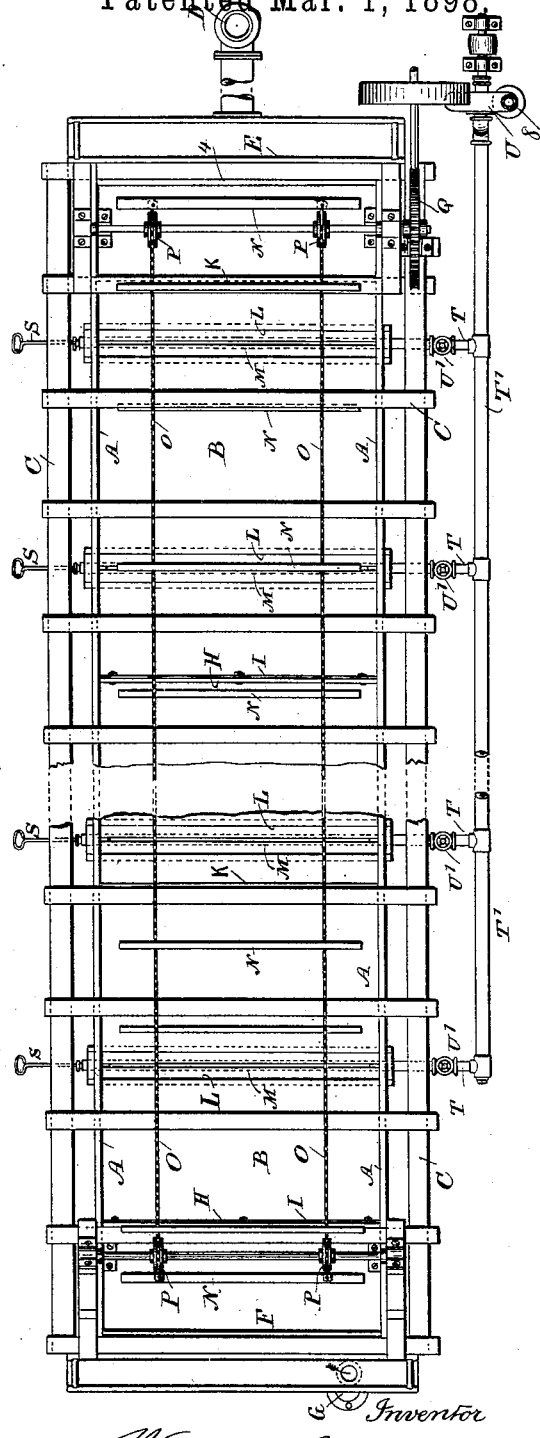

(No Model.) 2 Sheets—Sheet 2.
W. CURTIS.
APPARATUS FOR SEPARATING FIBERS, CLAY, OR OTHER MATERIAL FROM LIQUIDS.
No. 599,957. Patented Mar. 1, 1898.
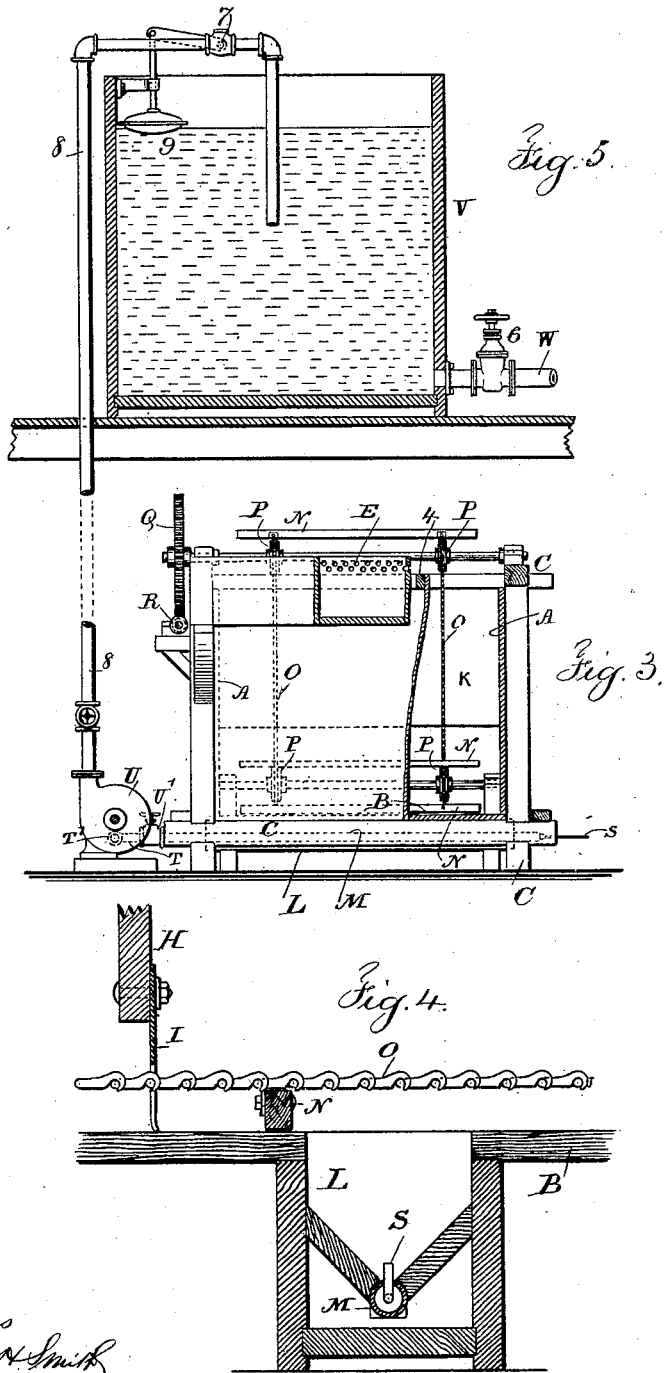

UNITED STATES PATENT OFFICE.

WARREN CURTIS, OF PALMER, NEW YORK.

APPARATUS FOR SEPARATING FIBERS, CLAY, OR OTHER MATERIAL FROM LIQUIDS.

SPECIFICATION forming part of Letters Patent No. 599,957, dated March 1, 1898.

Application filed July 16, 1897. Serial No. 644,780. (No model.)

*To all whom it may concern:*

Be it known that I, WARREN CURTIS, a citizen of the United States, residing at Palmer, in the county of Saratoga and State of New York, have invented an Improvement in Apparatus for Separating Fibers, Clay, or other Material from Liquids, of which the following is a specification.

In the waste water from paper or pulp mills fiber is frequently lost to a considerable extent, together with clay or other heavy materials which flow away with such water.

The object of the present invention is to provide for the gradual subsidence of the solid materials from the liquid and for the delivery of such materials without agitating the water and progressively, so that the apparatus is continuous in its operation. With this object in view the waste water from which materials held in suspension are to be separated is run in at one end of a tank, such materials being passed in a thin stream over a weir, so as not to agitate the materials in the tank, and the clear or nearly clear water passes out over a weir at the other end, so as to keep the tank with the liquid at a uniform level, and in the bottom of the tank transverse hoppers are provided leading to discharge-pipes, and the materials that subside from the liquid are scraped gradually to these hoppers by scrapers on endless chains, the movement being in the opposite direction to the flow of the water and also sufficiently gradual not to disturb the subsiding materials. By this arrangement the useful materials are removed from the waste water progressively, and in order to insure the deposit of the heavier materials baffle-boards are introduced across the tank, some extending up from the bottom and others alternating and extending down from the top, so as to detain the floating materials and also the heavier materials and effect the saving of the same.

In the drawings, Figure 1 is a longitudinal section illustrating the apparatus. Fig. 2 is a plan view. Fig. 3 is an end view, partly in section. Fig. 4 is a section, in larger size, of one of the transverse hoppers; and Fig. 5 is a section of the storage-tank.

The tank is to be of any desired size, so as to hold sufficient water in proportion to the gradual supply and discharge, and this tank may be of any desired material. I have represented the same as having sides A and bottom B, supported by frames C at suitable intervals, and the inlet-pipe D brings the materials to the weir E, from which said materials flow in a uniform layer over the dam 4 and pass down gradually into the liquid in the tank, and the overflow-weir F is to be slightly below the level of the dam 4, so that there will be but little descent or plunge of the water from the dam 4 into the water in the tank, and the overflow-weir F connects with the delivery-pipe G, which leads the waste water to the desired place of discharge. Across the tank are baffle-boards H and K, the boards K extending from above the water-line to one-half or two-thirds of the depth of the water, and the baffle-boards H extend up from the bottom from one-half to two-thirds of the depth of the water; but these baffle-boards H do not extend down to the bottom B of the tank, there being aprons I, of rubber or other suitable material, fastened at their upper edges at one side of the baffle-boards and resting at their bottom edges against the bottom of the tank. These aprons allow for the passage of the scrapers hereinafter referred to.

In the bottom B of the tank are transverse hoppers L. (Shown in larger size in the cross-section Fig. 4.) The hoppers are open across the bottom of the tank, as seen in Fig. 2, and inclined boards at the bottoms of the hoppers fit closely against the pipe M, that has a longitudinal slot in the top thereof, and the materials that subside from the water are gradually moved or scraped along upon the bottom B of the tank to these transverse hoppers, and with this object in view the slats N are connected to the endless chains O, that pass around the guide-pulleys P, and a slow movement is given to the guide-pulleys P, preferably by a gear-wheel Q and a worm-pinion R, (see Figs. 2 and 3,) that is revolved with regularity and at the desired speed by competent power, and by this arrangement the endless link belt or chain is moved at the proper speed and preferably with the scrapers that run upon the bottom, going in a direction opposite to the gradual flow of the water, so that the materials as they subside are carried to the transverse hoppers without agitating the water in the tank.

The hanging aprons I are notched where the link belts or endless chains O pass, and such aprons yield to the passing slats or scrapers and drop back, so as to prevent the current of water passing under the baffle-boards H.

It is advantageous to provide a rod S with a hooked end within the pipe at the bottom of each of the transverse hoppers, such rod coming out through a suitable opening or stuffing-box at the otherwise closed end of such pipe for the purpose of agitating the materials that may have subsided in the bottom of the transverse hopper and for clearing the slot in the pipe M, so that the materials may flow into the pipe T, that passes from the opposite end of the transverse hopper to a longitudinal pipe T', leading to a pump U, by which the materials are carried up to the storage vessel V.

A pipe W leads to the beater or mixing-engine, and the discharge is regulated by the cock 6, and there is a valve 7 in the rising delivery-pipe 8 and a lever and float 9 to such valve 7, so as to regulate the quantity of material discharged by the pump U into the storage-tank, because it is desirable not to pump up into such storage-tank V the materials from the tank A B any more rapidly than necessary, thereby allowing as much time as possible for the solid materials to subside in such tank A B. It is generally advantageous to employ a centrifugal pump U, as the materials are not liable to clog in the same.

It is to be understood that the number of transverse hoppers may be varied according to the size of the apparatus and that the operations performed are gradual and continuous, so that as much saving may be effected as may prove economical, and the materials thus saved are returned with regularity into the beater or mixing-engine, so as to insure uniformity in the paper product.

The cocks or valves at U' serve to regulate the quantity of material drawn off from each hopper, so that there will not be more accumulation in one hopper than in another.

The flow of materials from the storage vessel is regulated according to the requirements of the mixing-engines, as the less quantity drawn from the settling-tank the better, because of being more concentrated and valuable, and the materials drawn from the storage vessel are available instead of fresh water.

In practice it is found that the pulp fiber is injured by fermentation if allowed to remain for a day or two for settling. By the present improvement, the operations being progressive and continuous, the pulp is saved and returned to the engine as quickly as possible and in its original fresh condition.

The inlet-opening or weir or dam may be at any desired level, there being advantageously a box E, into which the pipe D opens, so that the supply may be spread with uniformity into the tank. If desired, the storage-tank V may be dispensed with and the pipe 8 from the pump U may lead direct to the beater or mixing-engine. The scrapers can be moved in either direction.

I claim as my invention—

1. The combination in a settling-tank, of a supply-weir at one end and a discharge-weir at the other end near the water-level, so that the materials may run into the tank with but little plunge or agitation, baffle-boards extending across the tank, one set rising from the bottom and the other and alternating baffle-boards extending down from above the water-line for detaining the solid materials and causing them to subside, hoppers across the bottom of the tank for receiving the heavier materials and pipes through which such heavier materials are discharged from the bottoms of the hoppers, and scrapers and means for moving them gradually along the bottom of the tank to scrape the solid materials into the hoppers, substantially as set forth.

2. The combination with the settling-tank, of scrapers and means for moving the same along at the bottom of the tank, baffle-boards sufficiently high above the bottom of the tank for the scrapers to pass below them, and a receptacle for the material acted upon by the scrapers, and means for discharging the same, substantially as set forth.

3. The combination with the settling-tank, of scrapers and means for moving the same upon the bottom of the tank, and baffle-boards sufficiently high above the bottom of the tank for the scrapers to pass below them, and aprons hanging between the lower portions of the baffle-boards and the bottom of the settling-tank, and yielding as the scrapers pass along, and receptacles for the solid material acted upon by the scrapers, substantially as specified.

4. The settling-tank having transverse hoppers and discharge-pipes from the same, in combination with endless chains and transverse scrapers connected to such chains and means for moving the same gradually for scraping the solid materials that subside into the transverse hoppers, substantially as set forth.

5. The settling-tank having transverse hoppers in the bottom and delivery-pipes, in combination with scrapers and mechanism for moving the same gradually along the bottom of the tank, and agitators in the delivery-pipes of the transverse hoppers, substantially as set forth.

6. The settling-tank having transverse hoppers and delivery-pipes in combination with scrapers and mechanism for moving the same, a pipe and pump for drawing the materials from the transverse hoppers, a storage-tank into which such materials are pumped and a pipe and cock for delivering such materials for use, substantially as set forth.

7. The settling-tank having transverse hoppers and delivery-pipes in combination with scrapers and mechanism for moving the same, a pipe and pump for drawing the materials from the transverse hoppers, a storage-tank into which such materials are pumped and a pipe and cock for delivering such materials for use, and a float and valve for regulating the supply of materials into such storage-tank, substantially as set forth.

Signed by me this 8th day of July, 1897.

WARREN CURTIS.

Witnesses:
A. L. PARMENTER,
T. ELIXMAN.